US010752278B2

(12) United States Patent
Canas et al.

(10) Patent No.: US 10,752,278 B2
(45) Date of Patent: Aug. 25, 2020

(54) SUSPENSION SYSTEM FOR STROLLER

(71) Applicant: MONAHAN PRODUCTS, LLC, Rockland, MA (US)

(72) Inventors: Luis Alejandro Canas, Stoughton, MA (US); Alex Richard Zadrozny, Pembroke, MA (US); Andrew Nathan Reynolds, Medway, MA (US); Eric Perlman, Weymouth, MA (US); Trung Q. Phung, Milton, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 0 days.

(21) Appl. No.: 16/361,388

(22) Filed: Mar. 22, 2019

(65) Prior Publication Data

US 2019/0291768 A1     Sep. 26, 2019

Related U.S. Application Data

(60) Provisional application No. 62/647,281, filed on Mar. 23, 2018.

(51) Int. Cl.
*B62B 9/18*     (2006.01)
*F16F 3/04*     (2006.01)
(Continued)

(52) U.S. Cl.
CPC ................ *B62B 9/18* (2013.01); *B60G 11/32* (2013.01); *F16F 1/041* (2013.01); *F16F 3/04* (2013.01); *B62B 7/044* (2013.01); *B62B 2301/20* (2013.01)

(58) Field of Classification Search
CPC ....... B62B 9/18; B62B 7/044; B62B 2301/20; F16F 3/04; F16F 1/041; F16F 1/128; F16F 1/047; B60G 11/32
See application file for complete search history.

(56) References Cited

U.S. PATENT DOCUMENTS

| 487,050 | A | * | 11/1892 | Heller et al. | ............... | B62B 9/18 |
| | | | | | | 296/35.4 |
| 1,271,987 | A | * | 7/1918 | Adams | ...................... | B62B 9/18 |
| | | | | | | 296/35.4 |

(Continued)

FOREIGN PATENT DOCUMENTS

DE          20112112 U1     10/2001
DE     102014103096 A1      9/2015
(Continued)

OTHER PUBLICATIONS

Extended European Search Report from corresponding European Application No. 19164642.1 dated Aug. 23, 2019.

*Primary Examiner* — Erez Gurari
(74) *Attorney, Agent, or Firm* — Lando & Anastasi, LLP

(57) ABSTRACT

A child stroller includes a frame member and a wheel attachment member including a first end and a second end. A wheel is coupled to the first end, with the second end coupled to the frame member. The stroller further includes a shock absorber having a body, an upper end coupled to the frame member, a lower end coupled to the wheel attachment member, and a spring mechanism disposed within the body. The spring mechanism includes an upper portion exhibiting a first spring constant, and a lower portion exhibiting a second spring constant different from the first spring constant.

15 Claims, 23 Drawing Sheets

(51) Int. Cl.
  *F16F 1/04*    (2006.01)
  *B60G 11/32*   (2006.01)
  *B62B 7/04*    (2006.01)

(56) References Cited

U.S. PATENT DOCUMENTS

| | | | | |
|---|---|---|---|---|
| 1,428,166 | A * | 9/1922 | Headley | B62B 9/18 |
| | | | | 267/5 |
| 2,714,013 | A * | 7/1955 | O'Hearn | B62B 9/18 |
| | | | | 280/47.41 |
| 3,100,651 | A * | 8/1963 | Reese | B62B 7/10 |
| | | | | 280/30 |
| 4,521,002 | A * | 6/1985 | Adorjan | B60G 15/063 |
| | | | | 267/170 |
| 5,000,470 | A | 3/1991 | Kamler et al. | |
| 5,364,119 | A * | 11/1994 | Leu | B62B 7/06 |
| | | | | 280/647 |
| 5,887,889 | A * | 3/1999 | Andrus | B62B 7/06 |
| | | | | 280/642 |
| 8,262,107 | B2 * | 9/2012 | Tuckey | B62B 9/18 |
| | | | | 267/5 |
| 10,370,017 | B1 * | 8/2019 | Ogrin | B62B 7/044 |
| 2003/0019076 | A1 | 1/2003 | Nagai et al. | |
| 2003/0201617 | A1 * | 10/2003 | Hartenstine | B62B 7/10 |
| | | | | 280/47.38 |
| 2003/0201625 | A1 * | 10/2003 | Espenshade | B62B 7/10 |
| | | | | 280/642 |
| 2003/0201626 | A1 * | 10/2003 | Hartenstine | B62B 7/083 |
| | | | | 280/642 |
| 2004/0169353 | A1 * | 9/2004 | Kinzel | B62B 3/02 |
| | | | | 280/650 |
| 2007/0210544 | A1 * | 9/2007 | Chen | B60B 33/001 |
| | | | | 280/47.34 |
| 2011/0057404 | A1 | 3/2011 | Tuckey et al. | |
| 2012/0153583 | A1 * | 6/2012 | Yuan | B62B 7/008 |
| | | | | 280/30 |
| 2012/0286462 | A1 * | 11/2012 | Pepka | F16F 3/04 |
| | | | | 267/177 |
| 2015/0076775 | A1 * | 3/2015 | Wu | B62B 7/083 |
| | | | | 280/38 |
| 2017/0274919 | A1 * | 9/2017 | Somerset | B62B 7/02 |
| 2019/0291768 | A1 * | 9/2019 | Canas | B60G 11/32 |

FOREIGN PATENT DOCUMENTS

| | | |
|---|---|---|
| EP | 1167157 A1 | 1/2002 |
| EP | 3078363 A1 | 10/2016 |
| KR | 101559165 B1 | 10/2015 |
| WO | 2013149640 A1 | 10/2013 |

* cited by examiner

SUSPENSION SYSTEM FOR STROLLER

RELATED APPLICATIONS

This application claims priority under 35 U.S.C. § 119(e) to U.S. Provisional Application Ser. No. 62/647,281 titled "Suspension System for Stroller" filed on Mar. 23, 2018, which is herein incorporated by reference in its entirety.

BACKGROUND

Aspects and examples of the present disclosure are directed generally to child conveyance devices, for example, strollers, and to suspension systems for same. A stroller is generally a chair-like carriage with wheels for transporting a baby or child. Some strollers may include a single seat for receiving a single passenger for transporting. Strollers may include a set of four wheels or may be in a tricycle configuration including three wheels.

SUMMARY

One aspect of the present disclosure is directed to a child stroller comprising a frame member and a wheel attachment member including a first end and a second end. A wheel is coupled to the first end, with the second end coupled to the frame member. The stroller further comprising a shock absorber having a body, an upper end coupled to the frame member, a lower end coupled to the wheel attachment member, and a spring mechanism disposed within the body. The spring mechanism includes an upper portion exhibiting a first spring constant, and a lower portion exhibiting a second spring constant different from the first spring constant.

Embodiments of the child stroller further may include coupling the second end of the wheel attachment member to a lower intermediate portion of the frame member by a pivot. The upper end of the shock absorber may be coupled to an upper intermediate portion of the frame member. The shock absorber further may comprise an upper housing including a recess, a lower housing including a recess, and a spring body having a upper end extending into the recess of the upper housing and a lower end extending into the recess in the lower housing. The stroller further may include an upper coil spring and a lower coil spring disposed in the spring body, with the upper coil spring and lower spring having different spring constants. The stroller further may include an upper spring seat disposed with in the upper housing, with an upper end of the upper coil spring being disposed on a lower surface of the upper spring seat. The upper spring seat may be secured within the upper housing by an upper spring seat rivet that passes through the upper spring seat and through apertures defined in front and rear faces of the upper housing. A lower end of the upper coil spring and an upper end of the lower coil spring may rest on upper and lower faces, respectively, of a spring separator disposed with the spring body. The spring separator may be fixed in place within the spring body. The stroller further may include a marking on the spring body that is obscured by one of the lower housing and the upper housing to a greater degree when the shock absorber is compressed than when the shock absorber is in a relaxed state. The stroller further may include a single coil spring disposed within the spring body, the single coil spring including an upper portion exhibiting a first spring constant, and a lower portion exhibiting a second spring constant different from the first spring constant. An upper end of the single coil spring may be coupled to a spring retainer that is disposed within the recess of the upper housing. The spring retainer may be secured within the recess of the upper housing by a rivet that passes through an aperture in a front of the upper housing, through the spring retainer, and out of an aperture defined in a rear of the upper housing. The rivet also may pass though slots defined in front and rear faces of the lower housing. A lower end of the single coil spring may rest on a lower spring landing defined at a lower end of the recess of the lower housing.

Another aspect of the disclosure is directed to a shock absorber for a child stroller. In one embodiment, the shock absorber comprises a body including an upper end coupled to a frame member and a lower end coupled to a wheel attachment member, and a spring mechanism disposed within the body. The spring mechanism includes an upper portion exhibiting a first spring constant, and a lower portion exhibiting a second spring constant different from the first spring constant.

Embodiments of the shock absorber further may include an upper housing including a recess, a lower housing including a recess, and a spring body having a upper end extending into the recess of the upper housing and a lower end extending into the recess in the lower housing. The shock absorber further may include an upper coil spring and a lower coil spring disposed in the spring body, with the upper coil spring and lower spring having different spring constants, and an upper spring seat disposed with in the upper housing, an upper end of the upper coil spring being disposed on a lower surface of the upper spring seat. The upper spring seat may be secured within the upper housing by an upper spring seat rivet that passes through the upper spring seat and through apertures defined in front and rear faces of the upper housing. A lower end of the upper coil spring and an upper end of the lower coil spring may rest on upper and lower faces, respectively, of a spring separator disposed with the spring body.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
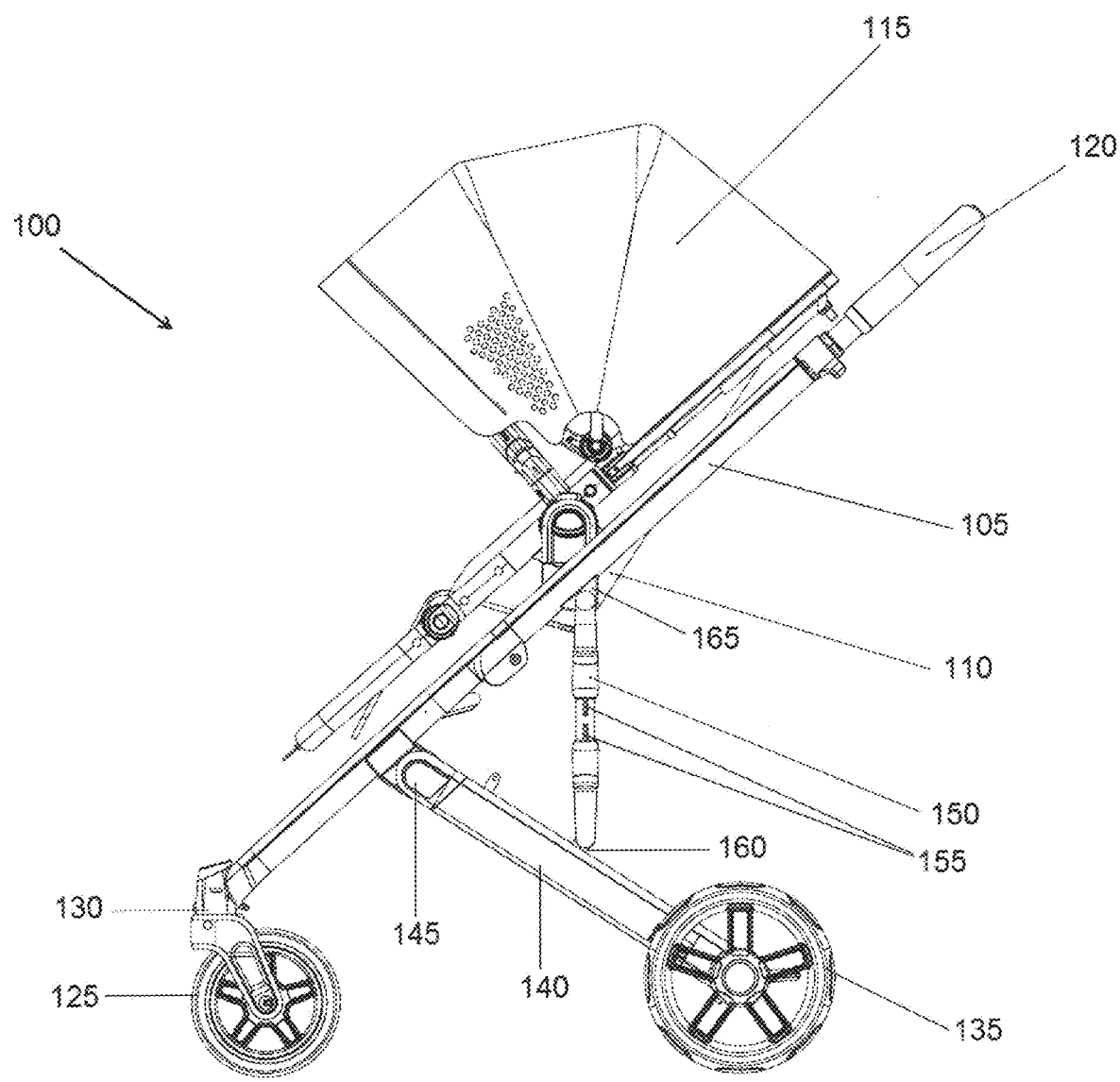
FIG. 1 an elevational view of a stroller from the side.

The disclosure is not limited in its application to the details of construction and the arrangement of components set forth in the following description or illustrated in the drawings. The disclosure is capable of other examples and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional terms.

Parents or caregivers of young children or babies may transport a child in a child conveyance device such as a stroller. It is often desirable that a stroller be transportable across a surface, for example, a sidewalk, road, or floor without producing a significant amount of vibration or shocks that might upset a child being transported in the stroller or awake the child should the child be sleeping. Aspects and embodiments disclosed herein include shock absorbing elements that may be present in various models of strollers.

One example of a stroller 100 to which aspects and embodiments disclosed herein may be applicable is illustrated in FIG. 1. The stroller 100 includes a main frame member 105 that supports a seat 110 for a child to sit in. A canopy 115 may be optionally connected to the seat 110 or main frame member 105 for protecting a child sitting in the seat 110 from the sun, rain, or wind. A handle 120 that a caregiver may use to push the stroller 100 may extend from or be formed integral with an upper portion of the main frame member 105. A set of front wheels 125 is attached to a lower front portion of the main frame member 105, optionally with rotating couplings 130 that allow the front wheels 125 to rotate about a vertical axis and facilitate maneuverability of the stroller 100. A set of rear wheels 135 are attached to lower rear portions of respective elongate rear wheel attachment members 140. The rear wheel attachment members 140 are mechanically coupled to a lower intermediate portion of the main frame member 105 by a pivot 145 that allows the rear wheel attachment members 140 to rotate relative to the main frame member 105 about a horizontal axis.

The rear wheel attachment members 140 are mechanically coupled to an upper intermediate portion of the main frame member 105 by a respective pair of shock absorbers 150. The stroller 100 is configured such that if the rear wheels 135 roll over an obstacle the rear wheel attachment members 140 may rotate relative to the main frame member 105 and shock associated with rolling over the obstacle is absorbed or dampened by the pair of shock absorbers 150. The shock absorbers 150 may be rotatably coupled to the rear wheel attachment members 140 via flanges 160 and associated fasteners, for example, screws, rivets, or bolts and may be rotatably coupled to the main frame member 105 via flanges 165 and associated fasteners, for example, screws, rivets, or bolts. Rotation of the shock absorbers about a horizontal axis relative to the rear wheel attachment members 140 and main frame member 105 may facilitate rotation of the rear wheel attachment members 140 relative to the main frame member 105. In some embodiments, the shock absorbers 150 may include markings 155, for example, lines extending partially along a central portion or spring tube of the shock absorbers. The markings 155 may provide a visual indication of a degree to which the shock absorbers 150 are compressed.

Figure 2:
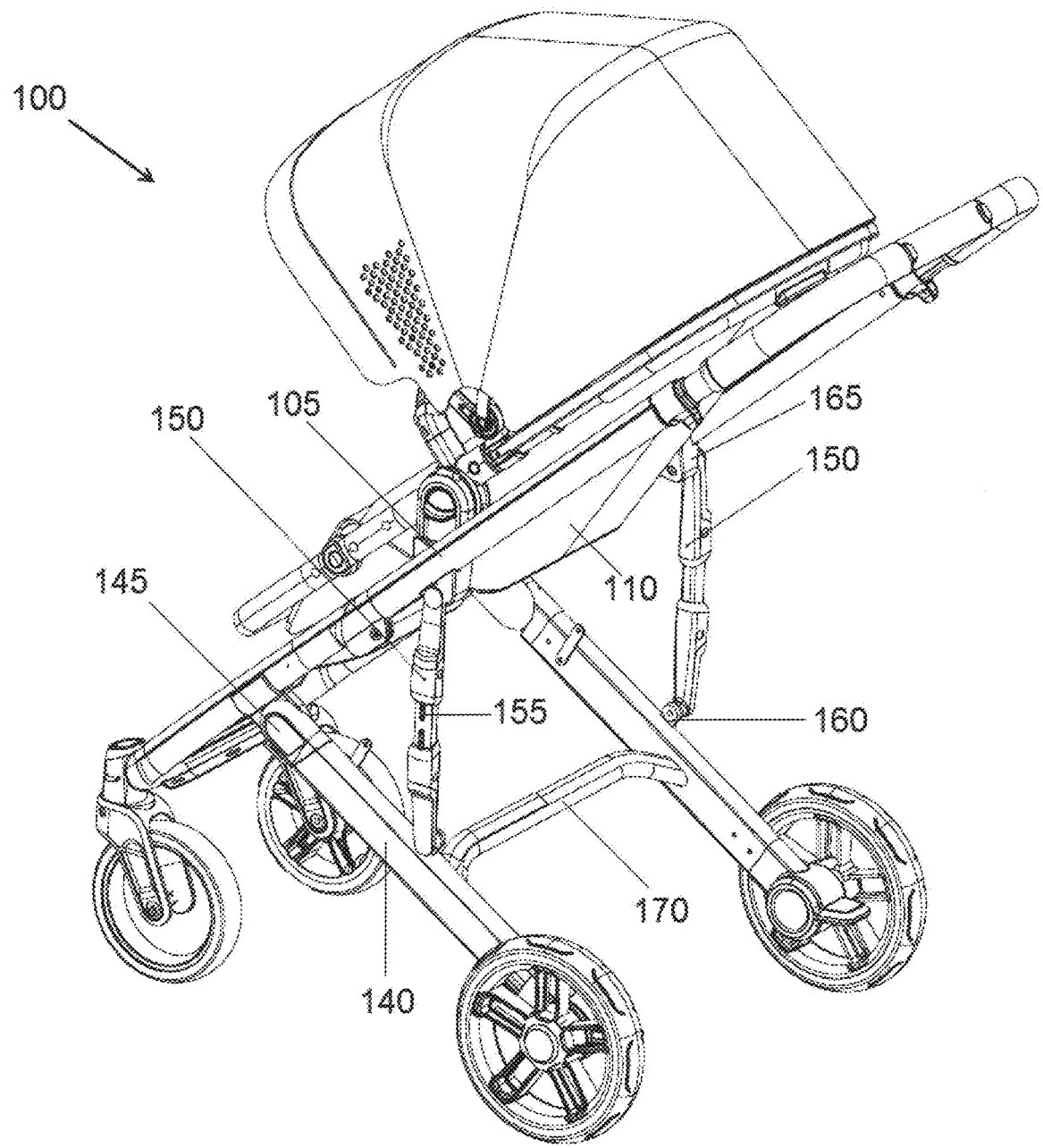
FIG. 2 is an isometric view of the stroller of FIG. 1.
Figure 3:
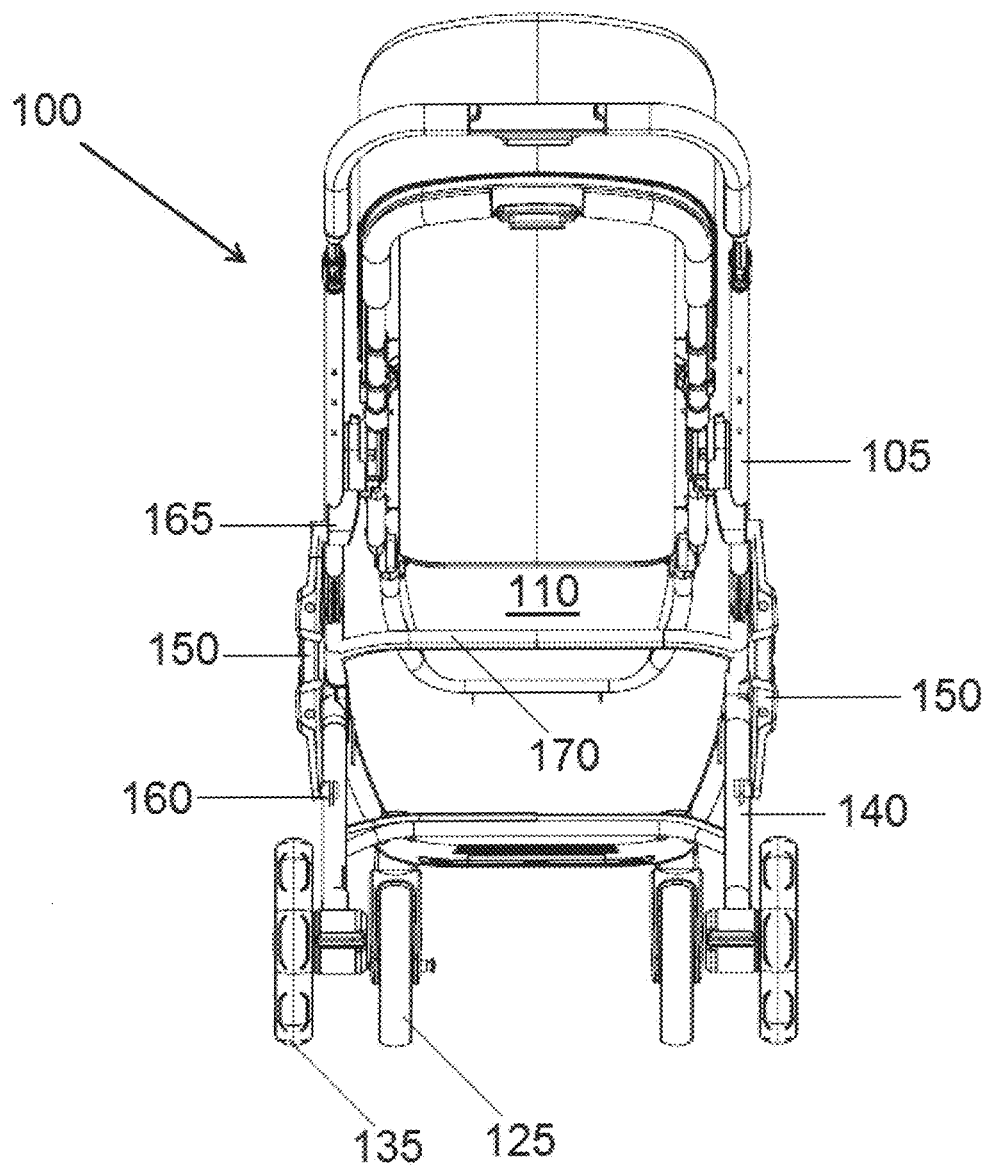
FIG. 3 is an elevation view of the stroller of FIG. 1 from the rear.

The stroller 100 is illustrated in isometric view in FIG. 2 and in plan view from the rear in FIG. 3. FIG. 2 and FIG. 3 illustrate that the pair of shock absorbers 150 couple the rear wheel attachment members 140 to the main frame member 105 at opposite left and right sides of the stroller 100. FIG. 2 and FIG. 3 also illustrate a cross bar 170 that mechanically couples the rear wheel attachment members 140 to one another at regions approximately half way along the length of each of the rear wheel attachment members 140.

Prior shock absorbers for child strollers have a set spring constant and exhibit a restorative force vs. displacement characterized by Hooke's Law:

$$F=-kx$$

where k is the spring constant, x is a displacement of one end of a spring relative to another, and F is the restorative force induced by compression of the spring.

Prior shock absorbers for child strollers may thus provide a desired amount of shock absorption or dampening when a child having one specific weight is being conveyed in the child stroller. For children weighing less than this specific weight, the shock absorbers may not compress to a desired degree upon application of a shock force and may provide an undesirably stiff ride and not adequately provide a desired amount of shock absorption or dampening. For children weighing more than this specific weight the shock absorbers may compress more than desired upon application of a shock force, possibly compressing completely, and not adequately provide a desired amount of shock absorption or dampening.

It may be desirable for shock absorbers of a child stroller to provide a desired amount of shock absorption or dampening for children having different weights. A child stroller including such shock absorbers may be used for a child throughout the years the caregiver of the child wishes to transport the child in the stroller as the child gains weight from, for example, about 16-18 pounds at six months of age to about 35-50 pounds at five to six years of age. A child stroller including shock absorbers that provide a desired amount of shock absorption or dampening for children having different weights may be used without adjustment or replacement of the shock absorbers as the child grows, or alternatively may be used without adjustment or replacement of the shock absorbers for different children having different weights.

Figure 4:
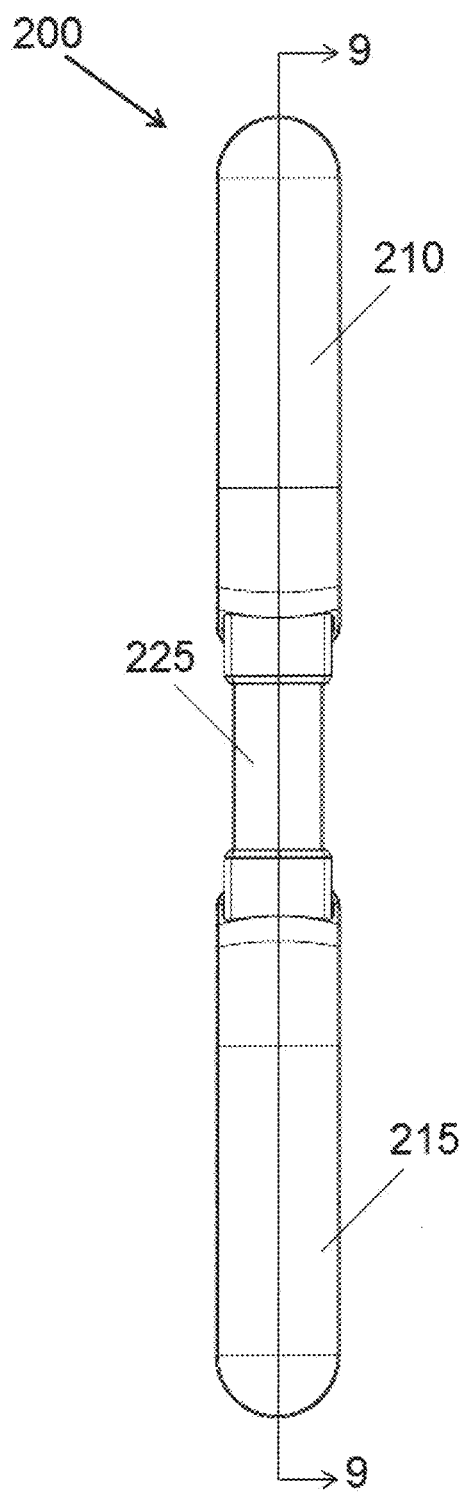
FIG. 4 is an elevational view from the front of an embodiment of a stroller shock absorber.
Figure 5:
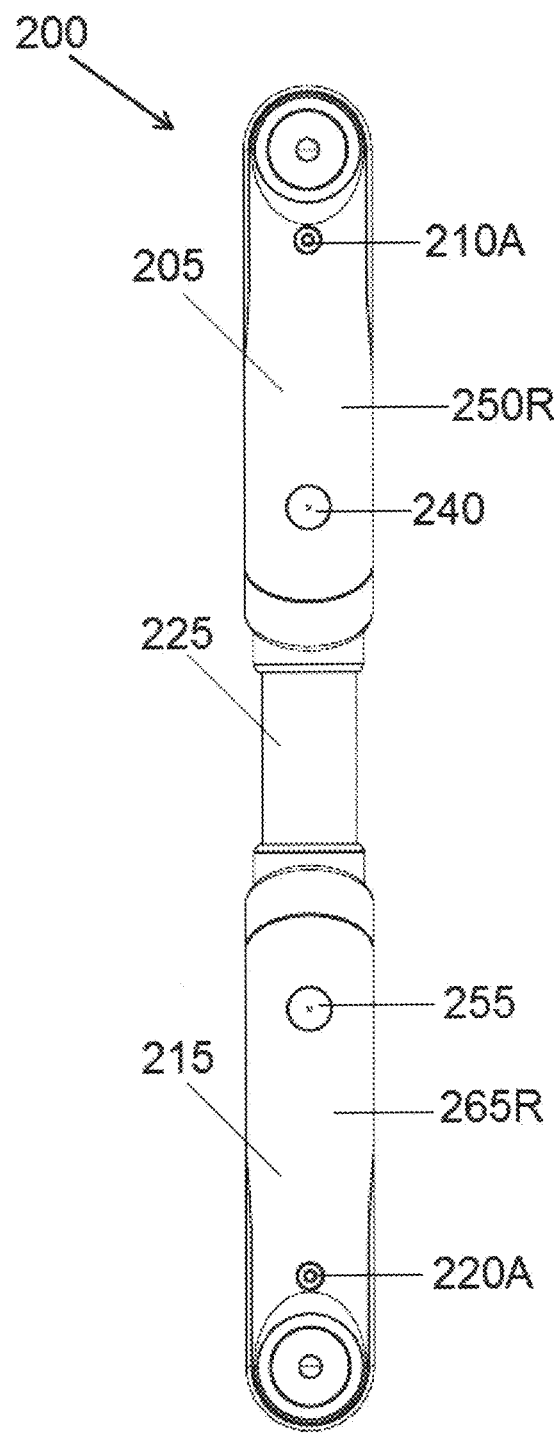
FIG. 5 is an elevational view from the rear of the stroller shock absorber of FIG. 4.
Figure 6:
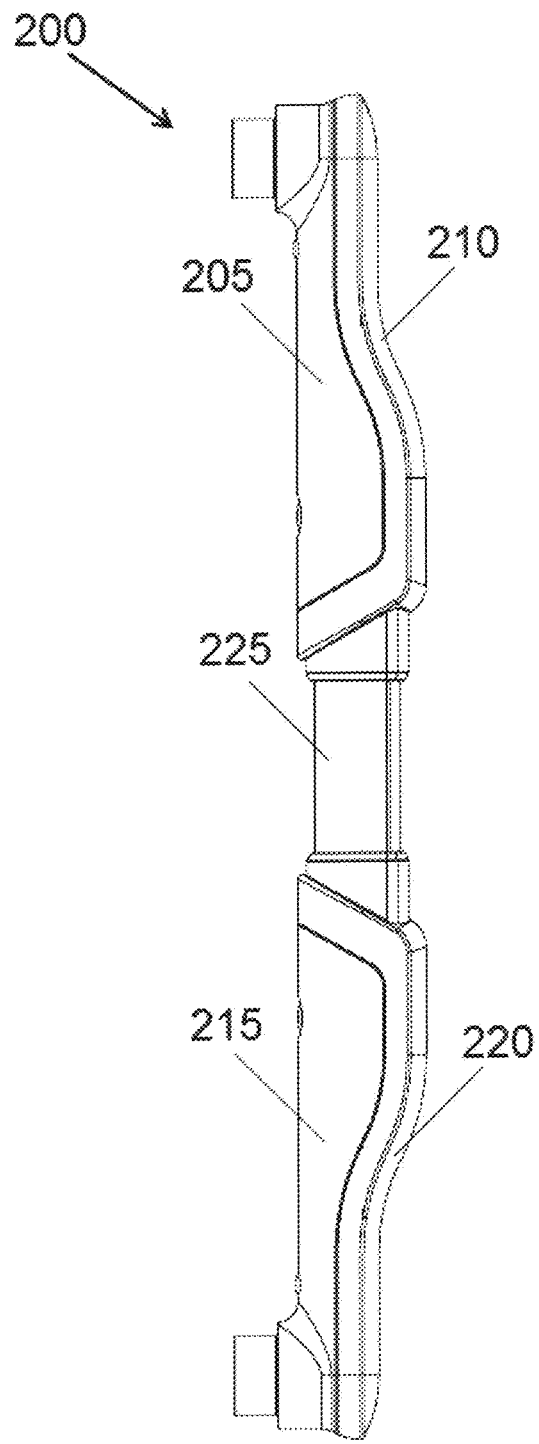
FIG. 6 is an elevational view from the side of the stroller shock absorber of FIG. 4.
Figure 7:
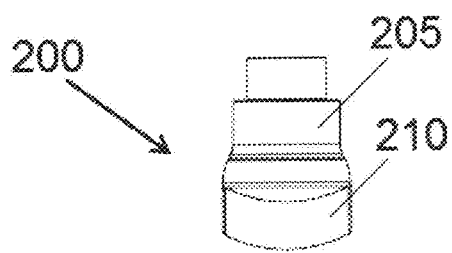
FIG. 7 is a top down plan view of the stroller shock absorber of FIG. 4.
Figure 8:
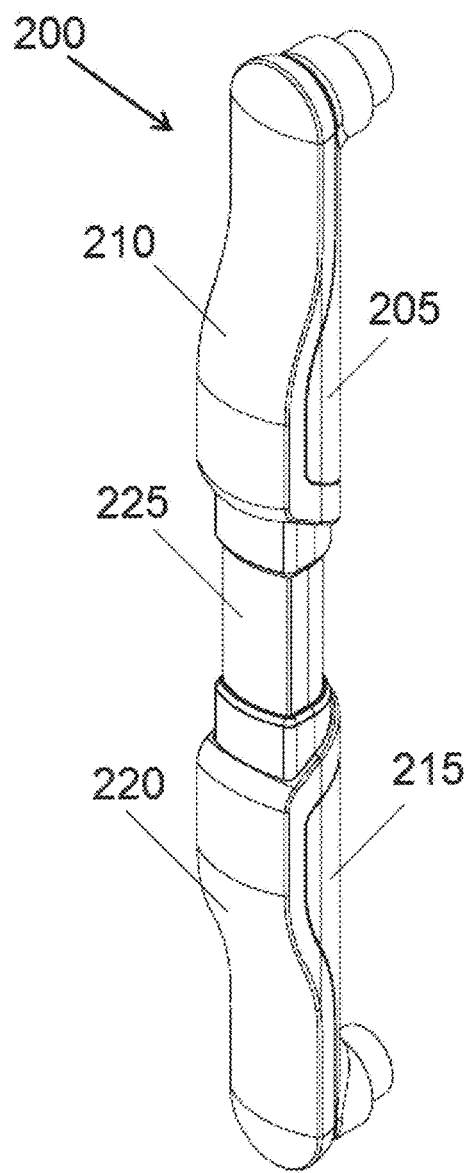
FIG. 8 is an isometric view of the stroller shock absorber of FIG. 4.
Figure 9:
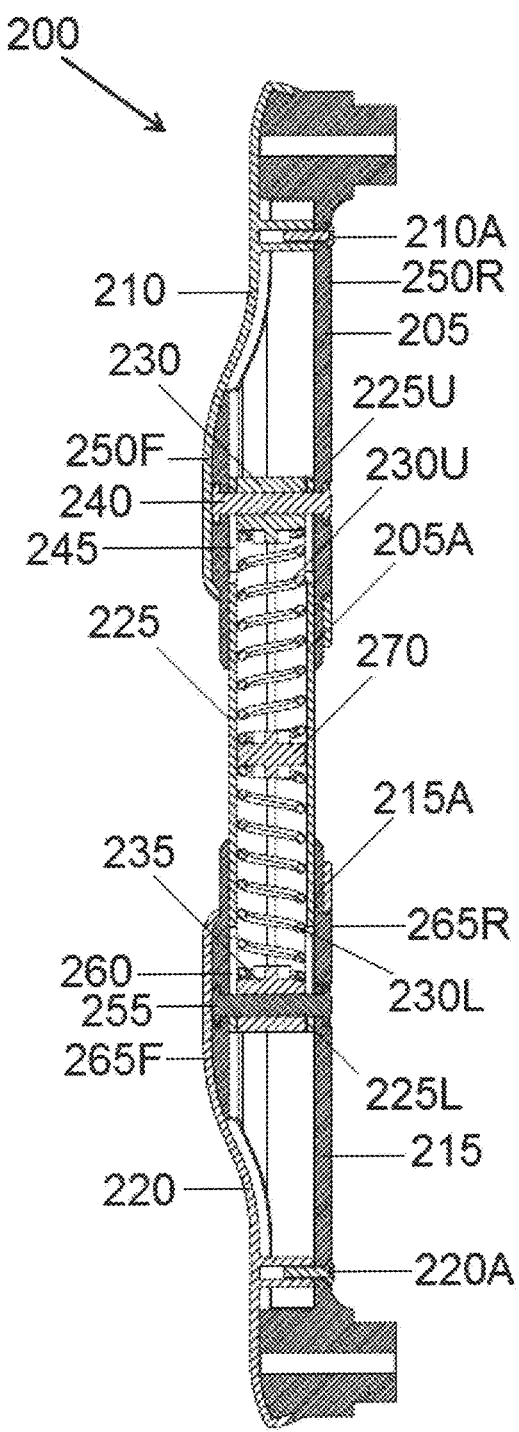
FIG. 9 is a cross-sectional view through line 9-9 of FIG. 4 of the stroller shock absorber of FIG. 4.
Figure 10:
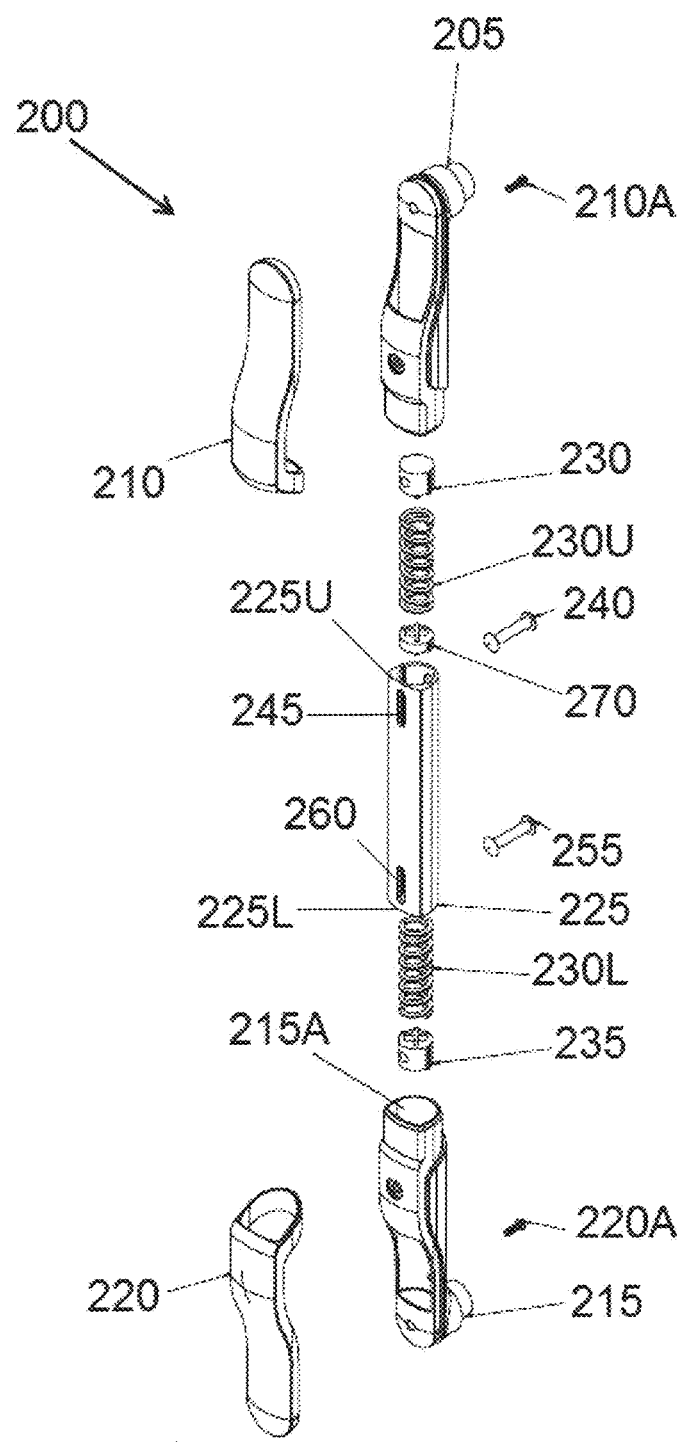
FIG. 10 is an exploded view of the stroller shock absorber of FIG. 4.

One embodiment of a shock absorber that may provide a desired amount of shock absorption or dampening for children having different weights is illustrated in an elevational view from the front in FIG. 4, in an elevational view from the rear in FIG. 5, in an elevational view from the side in FIG. 6, in a top down plan view in FIG. 7, in an isometric view in FIG. 8, in a cross-sectional view through line 9-9 of FIG. 4 in FIG. 9, and in an exploded view in FIG. 10.

The shock absorber, indicated generally at 200, includes an upper housing 205, an upper cover 210 that fits on the upper housing 205 and that is secured on the upper housing 205 with an upper cover screw 210A, a lower housing 215, a lower cover 220 that fits on the lower housing 215 and that is secured on the lower housing with a lower cover screw 220A, and a spring body 225 extending between the upper housing 205 and lower housing 215. The upper housing 205 and lower housing 215 include recesses 205A, 215A into which upper and lower ends 225U, 225L, respectively of the spring body 225 extend. Portions of the spring body 225 slide into and out from the recesses 205A, 215A of the upper housing 205 and lower housing 215 as the shock absorber 200 compresses and relaxes. A pair of coil springs including an upper coil spring 230U and a lower coil spring 230L are disposed within the spring body 225.

The upper coil spring 230U and lower coil spring 230L have different spring constants k. The upper coil spring 230U may have a lower spring constant than the lower coil spring 230L, although in other embodiments, the upper coil spring 230U may have a higher spring constant than the lower coil spring 230L. In some embodiments, the upper coil spring 230U has a spring constant that provides for it to absorb loads of between about 12-30 pounds and the lower coil spring has a spring constant that provides for it to absorb loads of between about 30-50 pounds.

An upper end of the upper coil spring 230U rests on a lower surface of an upper spring seat 230. A lower end of the lower coil spring 230L rests on an upper surface of a lower spring seat 235. The upper spring seat 230 is secured within the upper housing 205 by an upper spring seat rivet 240 that passes through the upper spring seat 230 and through slots 245 defined in front and rear faces of the spring body 225 and apertures defined in front and rear faces 250F, 250R of the upper housing 205. The upper cover 210 may hide the portion of the upper spring seat rivet 240 that passes through the aperture defined in the front face 250F of the upper housing 205 from view. A face of the portion of the upper spring seat rivet 240 that passes through the slot aperture defined in the rear face 250R of the upper housing 205 may be visible on the rear face 250R of the upper housing 205.

The lower spring seat 235 is secured within the lower housing 215 by a lower spring seat rivet 255 that passes through the lower spring seat 235 and through slots 260 defined in front and rear faces of the spring body 225 and apertures defined in front and rear faces 265F, 265R of the lower housing 215. The lower cover 220 may hide the portion of the lower spring seat rivet 255 that passes through the aperture defined in the front face 265F of the lower housing 215 from view. A face of the portion of the lower spring seat rivet 255 that passes through the aperture defined in the rear face 265R of the lower housing 215 may be visible on the rear face 265R of the lower housing 215. In other embodiments, the upper spring seat rivet 240 and/or lower spring seat rivet 255 may be replaced by pins, bolts, screws, or other elements that may secure the upper and lower spring seats 230, 235 in the upper and lower housings 205, 215 and slide through the slots 245, 260.

A lower end of the upper coil spring 230U and an upper end of the lower coil spring 230U rest on upper and lower faces, respectively, of a spring separator 270 disposed within the spring body 225. The spring separator 270 may be fixed or secured in place in the middle of the spring body 225 with, for example, an adhesive and or one or more fasteners (e.g., one or more screws, bolts, clips, screw threads, etc.). In other embodiments, the spring separator 270 may be fixed or secured in place closer to the upper end 225U or the lower end 225L of the spring body 225 or may freely travel through the interior of the spring body 225.

In operation, in the absence of an applied load, the upper coil spring 230U pushes the upper spring seat rivet 240 passing through the upper spring seat 230 to upper ends of the slots 245 in the spring body 225 and the lower coil spring 230L pushes the lower spring seat rivet 255 passing through the lower spring seat 235 to lower ends of the slots 260 in the spring body 225. As a load or shock is applied to the shock absorber 200, the coil spring with the lower spring constant, for example, the upper coil spring 230U first compresses, the upper end 225U of the spring body 225 slides inward into the recess 205A in the upper housing 205, and the upper spring seat rivet 255 passing through the upper spring seat 230 slides toward lower ends of the slots 245 in the spring body 225. The upper housing 205 may obscure greater amounts of the upper one of the markings 155 (see FIG. 1 and FIG. 2) as the upper end 225U of the spring body 225 slides inward into the recess 205A in the upper housing 205. If the applied load or shock is sufficiently strong to substantially fully compress the upper coil spring 230U, after the upper coil spring 230U is substantially fully compressed, the lower coil spring 230U compresses, the lower end 225L of the spring body 225 slides inward into the recess 215A in the lower housing 215, and the lower spring seat rivet 255 passing through the lower spring seat 235 slides toward upper ends of the slots 260 in the spring body 225. The lower housing 215 may obscure greater amounts of the lower one of the markings 155 as the lower end 225L of the spring body 225 slides inward into the recess 215A in the lower housing 215.

Upon release of the load or shock, the upper coil spring 230U and the lower coil spring 230L (if the lower coil spring 230L was compressed) relax, the end or ends of the spring body 225 slide outward from the upper and lower housings 205, 215, and the upper and lower spring seat rivet 240, 255 return to relaxed positions at the upper and lower ends of the respective slots 245, 260.

The materials of construction of the components of the shock absorber 200 are not limited to any particular materials, however, in some embodiments, the upper housing 205, the upper cover 210, the lower housing 215, the lower cover 220, the upper spring seat 230, the lower spring seat 235, and the spring separator 270 may be formed of glass filled polypropylene. The upper coil spring 230U, lower coil spring 230L, upper spring seat rivet 240, lower spring seat rivet 255, upper cover screw 210A, and lower cover screw 220A may be formed of steel. The spring body 225 may be formed of extruded aluminum.

Figure 11:
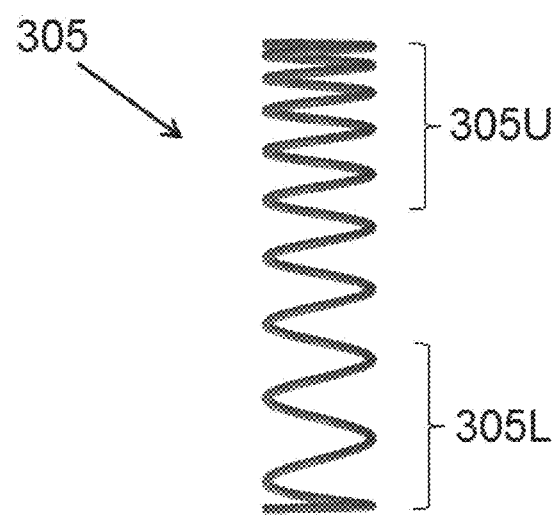
FIG. 11 illustrates a progressive coil spring that may be utilized in embodiments of a stroller shock absorber.

In other embodiments, a shock absorber for a stroller for a child may include only a single spring. The single spring may be a progressive spring, for example, as illustrated at 305 in FIG. 11 that will handle and perform with a wide range of loads. The coils of the spring 305 become progressively more widely spaced from one another along a length of the spring from the top of the spring 305 to the bottom.

An upper portion 305U of the spring 305 may exhibit a greater spring constant than a lower portion 305L of the spring 305.

Figure 12:
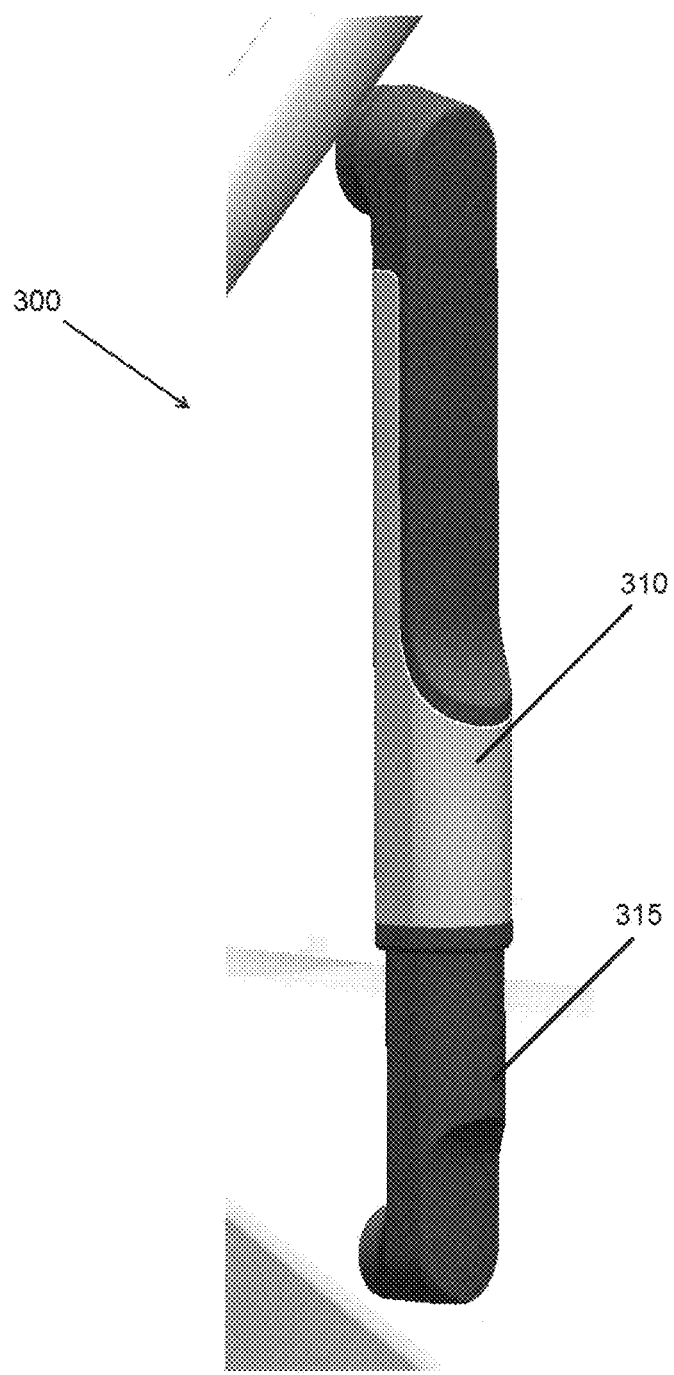
FIG. 12 is an isometric view of another embodiment of a stroller shock absorber.

An isometric view of a stroller shock absorber including the single spring 305 is illustrated generally at 300 in FIG. 12. The shock absorber 300 includes a body in which the spring 305 is disposed. The body includes and upper housing 310 to which an upper end of the spring 305 is mechanically coupled and a lower housing 315 to which a lower end of the spring 305 is mechanically coupled. The lower housing 315 may be pushed into a recess defined in the upper housing 310 upon application of a force, shock, or load to the shock absorber 300. The spring 305 may push the lower housing 315 back out of the recess in the upper housing 310 when the force, shock, or load is removed.

Figure 13:
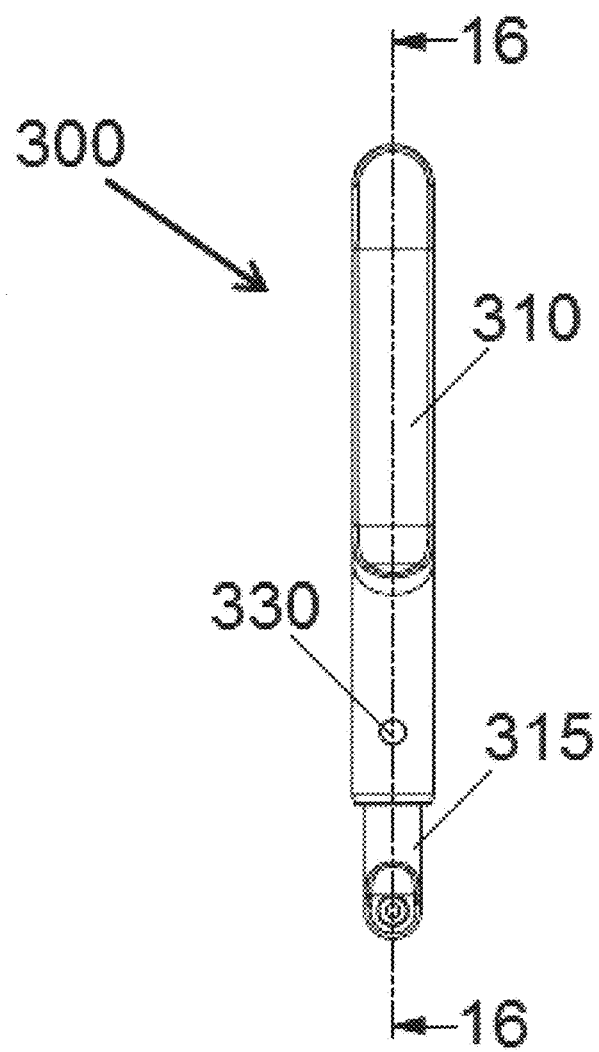
FIG. 13 is an elevational view from the front of the stroller shock absorber of FIG. 12.
Figure 14:
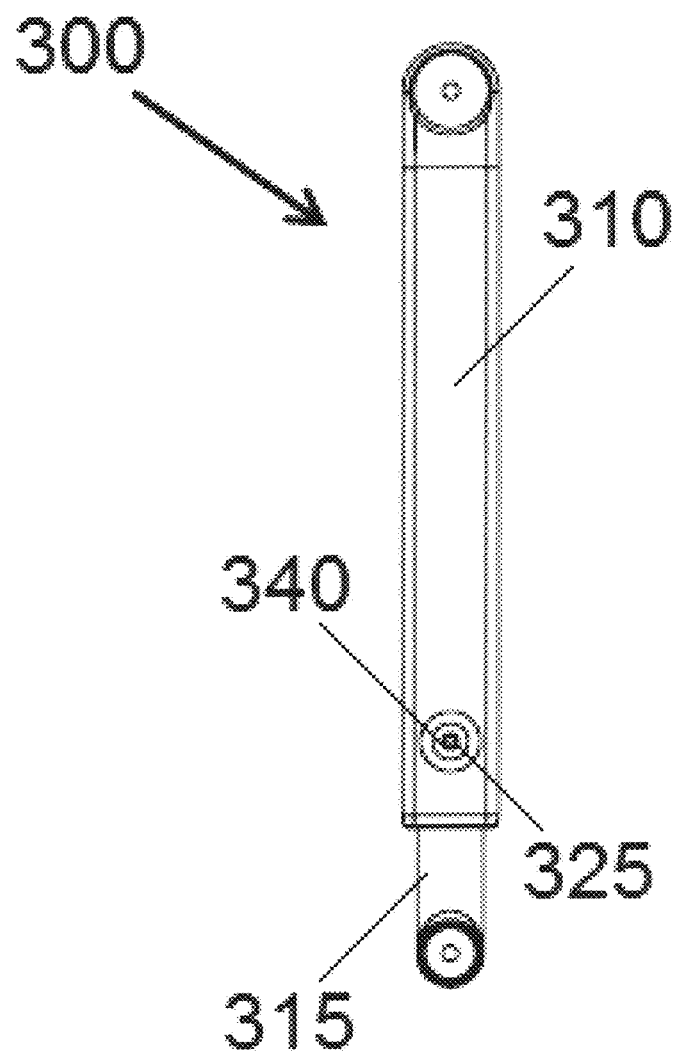
FIG. 14 is an elevational view from the rear of the stroller shock absorber of FIG. 12.
Figure 15:
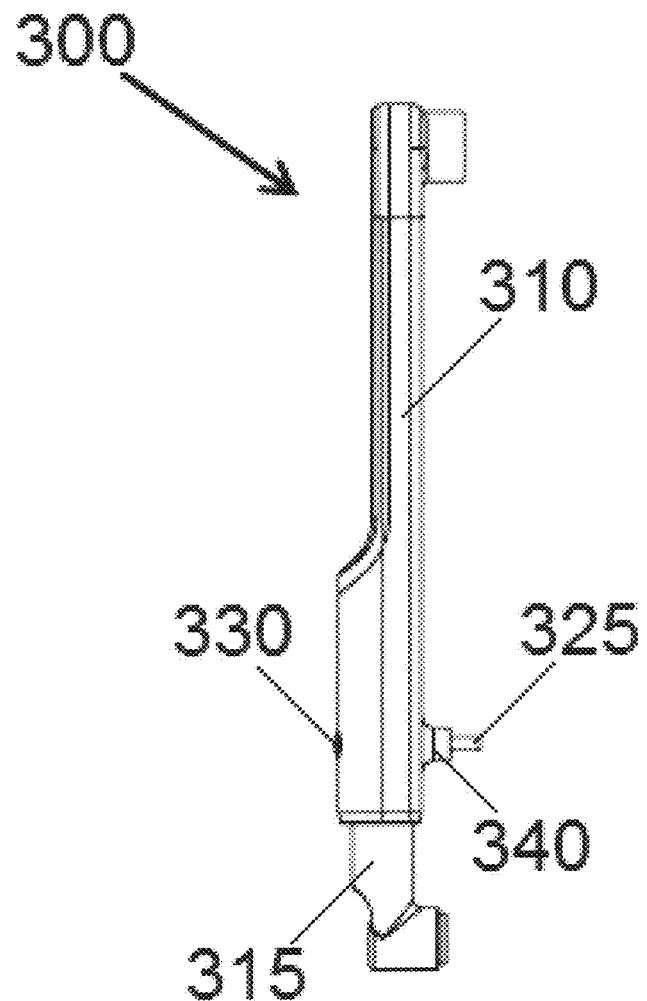
FIG. 15 is an elevational view from the side of the stroller shock absorber of FIG. 12.
Figure 16:
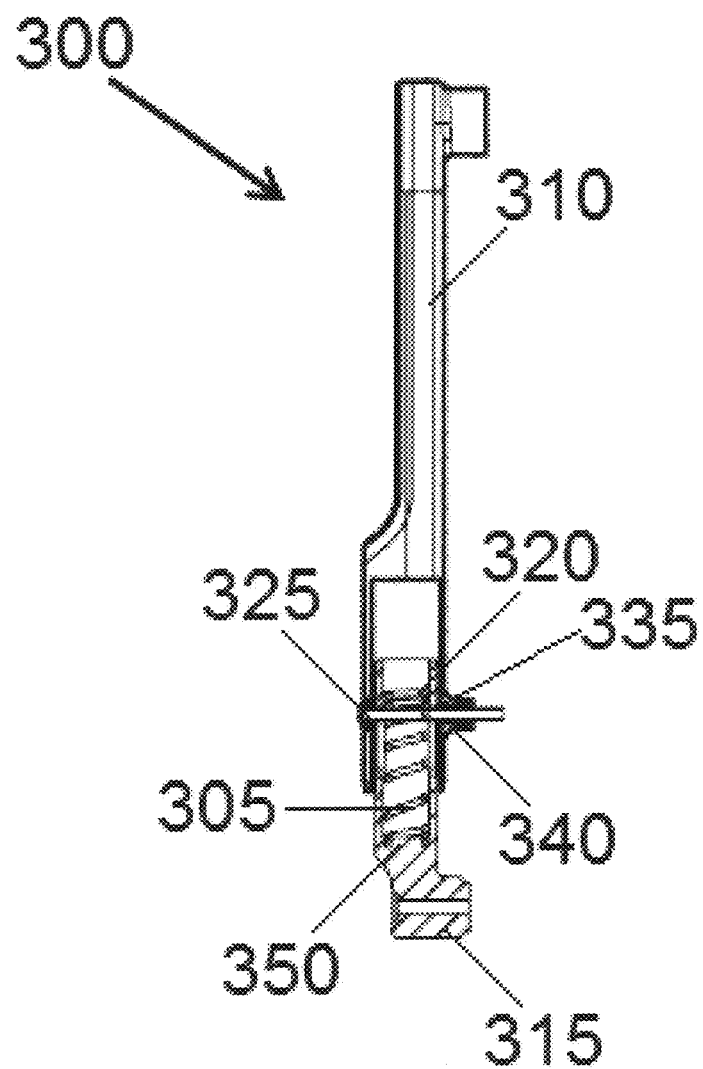
FIG. 16 is a cross-sectional view of the stroller shock absorber of FIG. 12 through the line 16-16 of FIG. 13.
Figure 17:
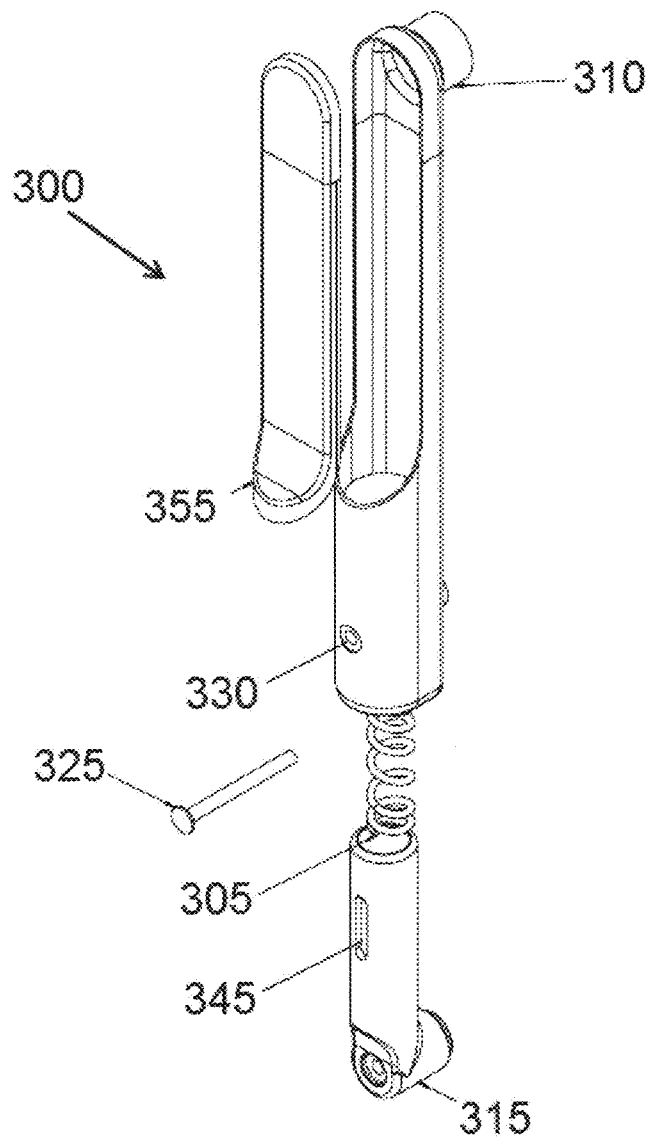
FIG. 17 is a partially exploded isometric view of the stroller shock absorber of FIG. 12.
Figure 18:
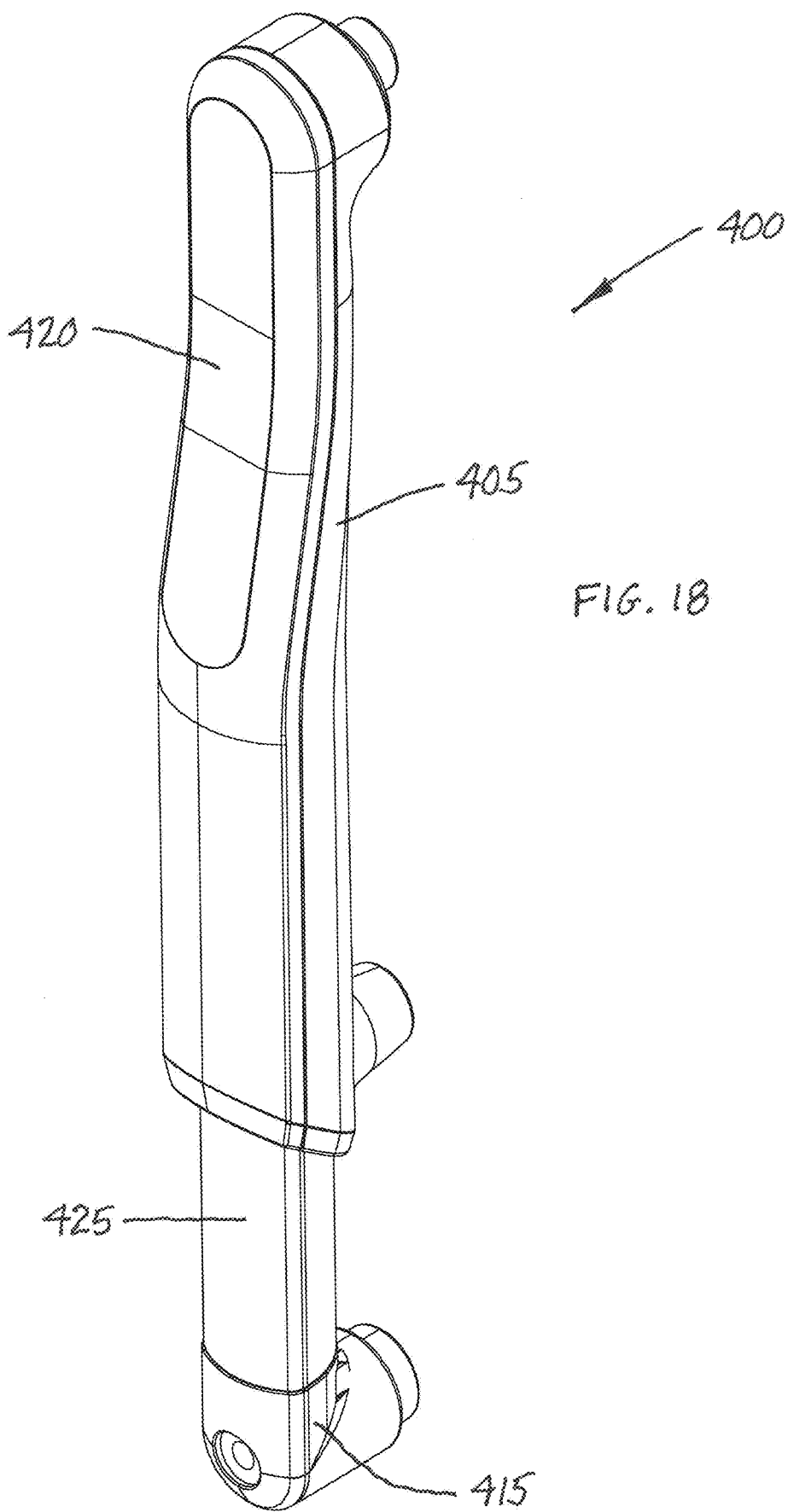
FIG. 18 is a perspective view of a stroller shock absorber of an embodiment of the present disclosure.
Figure 19:
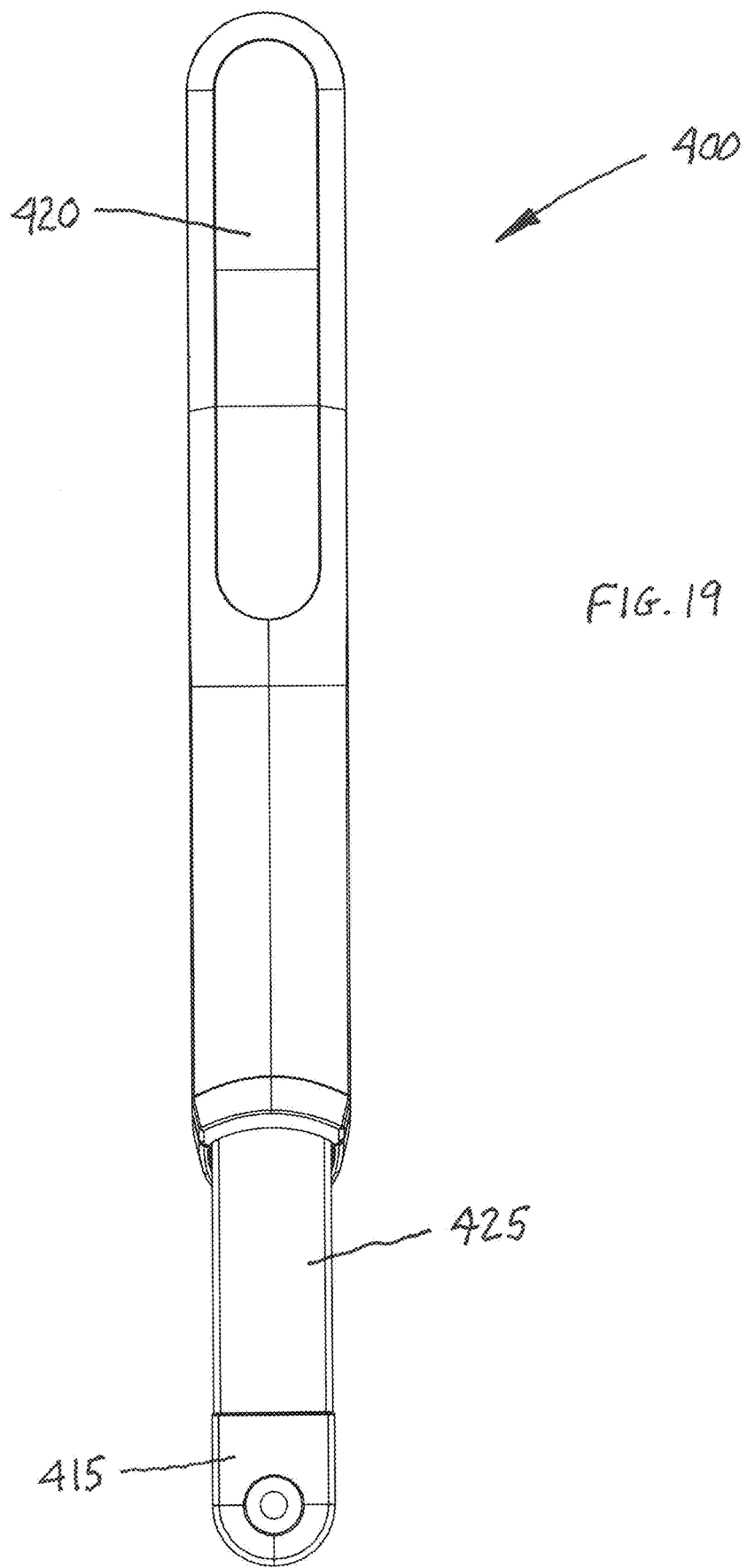
FIG. 19 is an elevational view from the front of the stroller shock absorber of FIG. 18.
Figure 20:
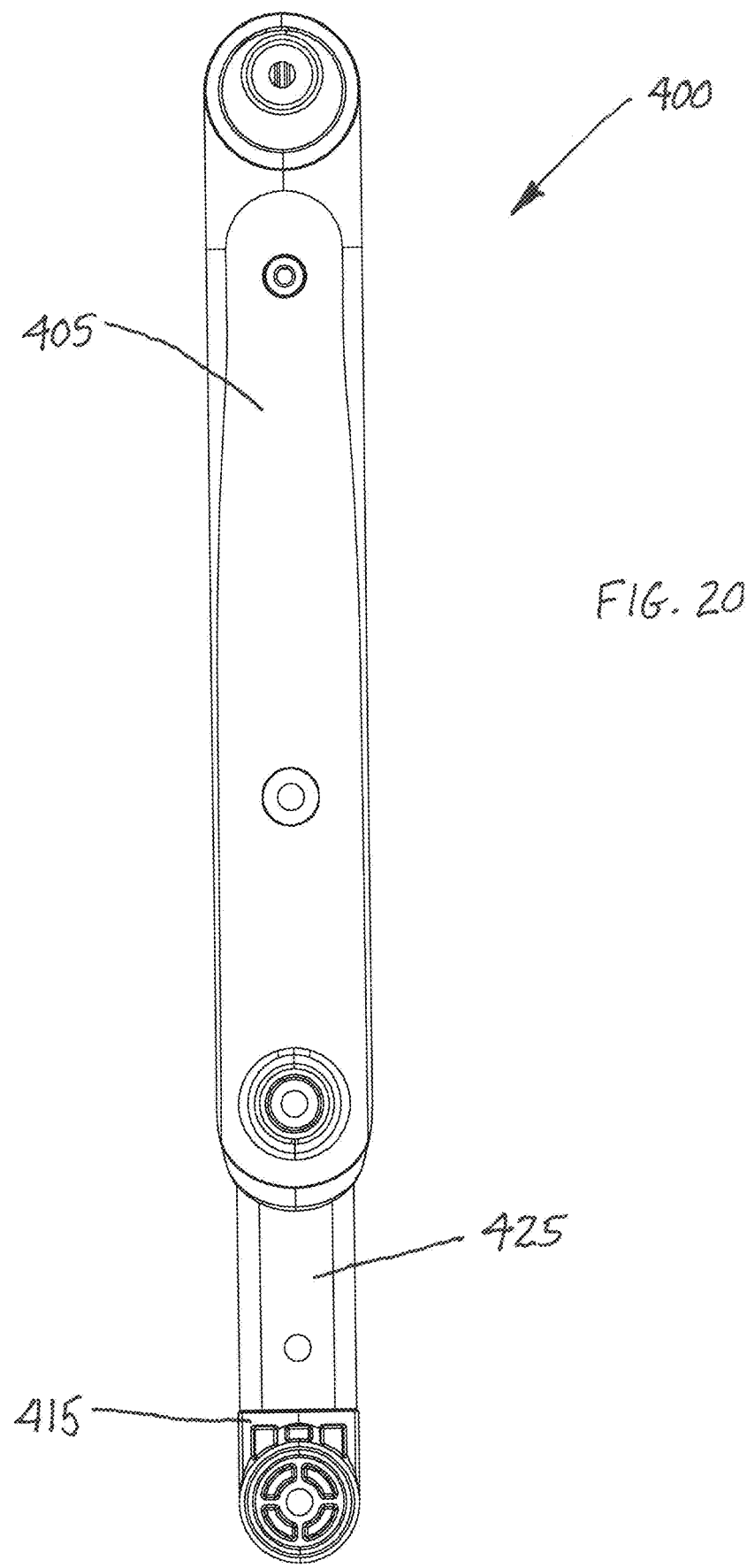
FIG. 20 is an elevational view from the rear of the stroller shock absorber of FIG. 18.
Figure 21:
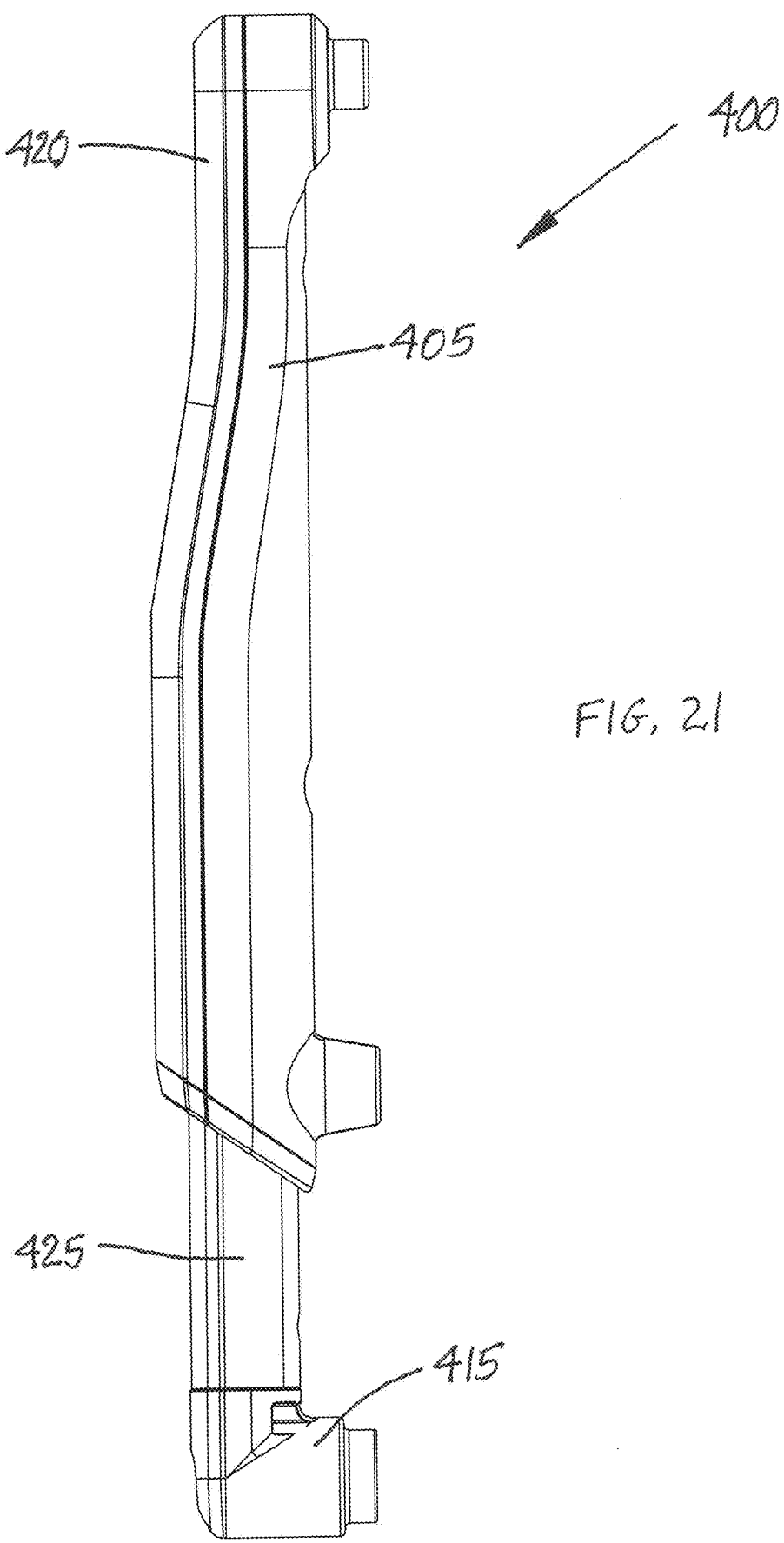
FIG. 21 is an elevational view from the side of the stroller shock absorber of FIG. 18.
Figure 22:
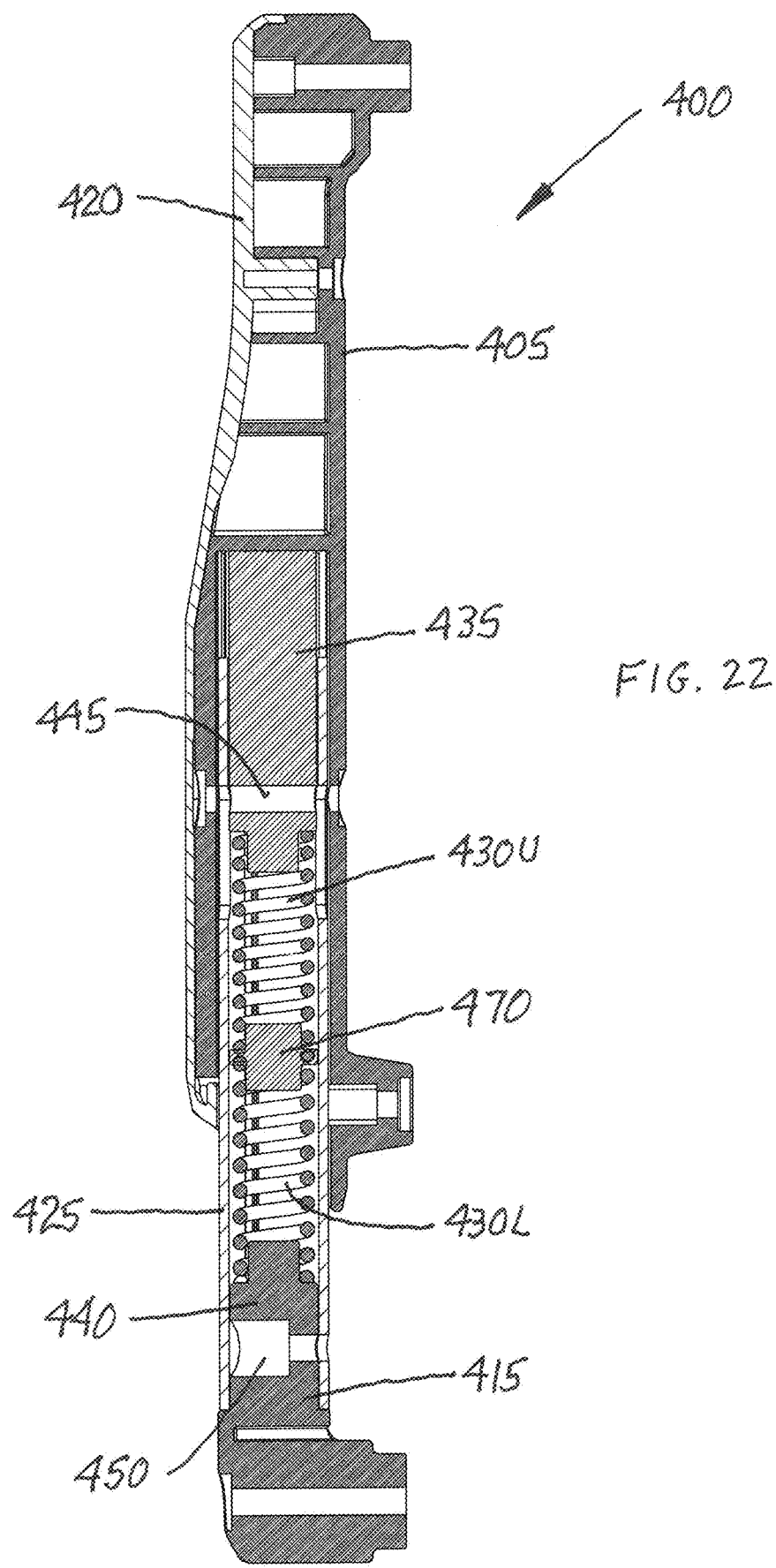
FIG. 22 is a cross-sectional view through line 22-22 of FIG. 19 of the stroller shock absorber of FIG. 18.
Figure 23:
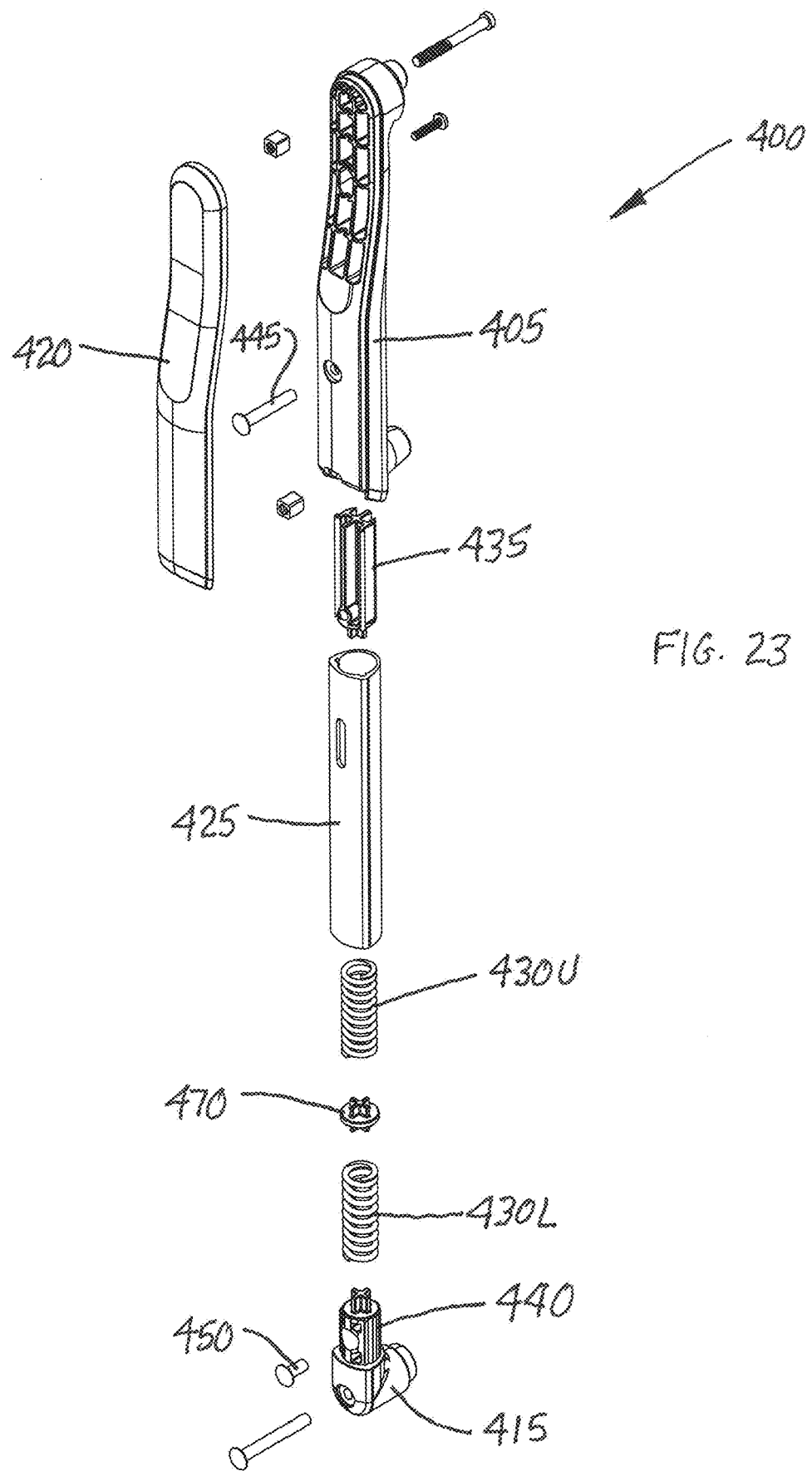
FIG. 23 is an exploded view of the stroller shock absorber of FIG. 18.

The stroller shock absorber 300 is further illustrated in an elevational view from the front in FIG. 13, in an elevational view from the rear in FIG. 14, in an elevational view from the side in FIG. 15, in a cross-sectional view through the line 16-16 of FIG. 13 in FIG. 16, and in a partially exploded isometric view in FIG. 17.

The upper end of the spring 305 is coupled to a spring retainer 320 that is disposed within a recess defined in the upper housing 310. The spring retainer 320 is secured within the recess defined in the upper housing 310 by a rivet 325 (or alternatively, a pin, screw, or bolt) that passes through an aperture 330 in the front of the upper housing 310, through the spring retainer 320, and out of an aperture 335 defined in the rear of the upper housing 310. The rivet 325 may be secured in place by a fastener 340, for example, a nut or clip. The rivet 325 may also pass through slots 345 defined in front and rear faces of the lower housing 315 (only one of which is visible in FIG. 17). Passage of the rivet 325 through the slots 345 defined in the front and rear faces of the lower housing 315 couples the lower housing 315 to the upper housing 310. The lower end of the spring 305 rests on a lower spring landing 350 defined at a lower end of a recess defined in the lower housing 315.

The upper housing 310 may further include an upper cover 355.

In use, the rivet 325 may slide through the slots 345 as the shock absorber 300 is compressed and relaxed. In the absence of an applied force the spring pushes the upper and lower housings 310, 315 apart, and the rivet 325 is disposed at upper ends of the slots 345. Upon application of a force, load, or shock, the spring 305 compresses, the lower housing 315 moves inward into the recess in the upper housing 310, and the rivet 325 moves toward the lower ends of the slots 345. Upon release of the force, load, or shock the spring 305 expands, the lower housing 315 moves out from the recess in the upper housing 310, and the rivet 325 moves back toward the upper ends of the slots 345.

The materials of construction of the components of the shock absorber 300 are not limited to any particular materials, however, in some embodiments, the upper housing 310, the upper cover 355, the lower housing 315, and the spring retainer 320 may be formed of glass filled polypropylene. The spring 305, rivet 325, and fastener 340 may be formed of steel or another metal.

Another embodiment of a shock absorber that may provide a desired amount of shock absorption or dampening is illustrated in FIGS. 18-23. The shock absorber, indicated generally at 400, includes an upper housing 405, a lower housing 415, a cover 420 that fits on the upper housing 405 and that is secured on the upper housing 405 with one or more screws, and a spring body 425 extending between the upper housing 405 and lower housing 415. The upper housing 405 and lower housing 415 include recesses into which upper and lower ends, respectively, of the spring body 425 extend. Portions of the spring body 425 slide into and out from the recesses of the upper housing 405 and lower housing 415 as the shock absorber 400 compresses and relaxes. A pair of coil springs including an upper coil spring 430U and a lower coil spring 430L are disposed within the spring body 425.

The upper coil spring 430U and lower coil spring 430L have different spring constants k. In one embodiment, the upper coil spring 430U may have a lower spring constant than the lower coil spring 430L, although in other embodiments, the upper coil spring 430U may have a higher spring constant than the lower coil spring 430L. In some embodiments, the upper coil spring 430U has a spring constant that provides for it to absorb loads of between about 12-30 pounds and the lower coil spring 430L has a spring constant that provides for it to absorb loads of between about 30-50 pounds.

An upper end of the upper coil spring 430U rests on a lower surface of an upper spring seat 435. A lower end of the lower coil spring 430L rests on an upper surface of a lower spring seat 440. The upper spring seat 435 is secured within the upper housing 405 by an upper spring seat rivet 445 that passes through the upper spring seat 435 and through slots defined in the spring body and apertures defined in the upper housing 405. The cover 420 may hide a portion of the upper spring seat rivet 445. The lower spring seat 440 is secured within the lower housing 415 by a lower spring seat rivet 450 that passes through the lower spring seat 440.

A lower end of the upper coil spring 430U and an upper end of the lower coil spring 430U rest on upper and lower faces, respectively, of a spring separator 470 disposed within the spring body 425. The spring separator 470 may be fixed or secured in place in the middle of the spring body 425 with, for example, an adhesive and or one or more fasteners (e.g., one or more screws, bolts, clips, screw threads, etc.). In other embodiments, the spring separator 470 may be fixed or secured in place closer to the upper end or the lower end of the spring body 425 or may freely travel through the interior of the spring body 425.

In operation, in the absence of an applied load, the upper coil spring 430U pushes the upper spring seat rivet 445 passing through the upper spring seat 435 to upper ends of the slots in the spring body 425. As a load or shock is applied to the shock absorber 400, the coil spring with the lower spring constant, for example, the upper coil spring 430U first compresses, the upper end of the spring body 425 slides inward into the recess in the upper housing 405, and the upper spring seat rivet 445 passing through the upper spring seat 435 slides toward lower ends of the slots in the spring body 425. The upper housing 405 may obscure greater amounts of the upper one of markings as the upper end of the spring body 425 slides inward into the recess in the upper housing 405. If the applied load or shock is sufficiently strong to substantially fully compress the upper coil spring 430U, after the upper coil spring 430U is substantially fully compressed, the lower coil spring 430U compresses, the lower end of the spring body 425 slides inward into the recess in the lower housing 415. The lower housing 415 may obscure greater amounts of the lower one of the markings as the lower end of the spring body 425 slides inward into the recess in the lower housing 415.

Upon release of the load or shock, the upper coil spring 430U and the lower coil spring 430L (if the lower coil spring 430L was compressed) relax, the end or ends of the spring body 425 slide outward from the upper and lower housings 405, 415, and the upper and lower spring seat rivet 445, 450 return to relaxed positions at the upper and lower ends of the respective slots.

The materials of construction of the components of the shock absorber 400 are not limited to any particular materials, however, in some embodiments, the upper housing 405, the lower housing 415, the cover 420, the upper spring seat 435, the lower spring seat 440, and the spring separator 470 may be formed of glass filled polypropylene. The upper coil spring 430U, lower coil spring 430L, upper spring seat rivet 445, lower spring seat rivet 450, and cover screw may be formed of steel. The spring body 425 may be formed of extruded aluminum.

Having thus described several aspects of at least one embodiment of this disclosure, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A child stroller comprising:
    a frame member;
    a wheel attachment member including a first end and a second end, a wheel coupled to the first end, the second end coupled to the frame member; and
    a shock absorber having a body, an upper end coupled to the frame member, a lower end coupled to the wheel attachment member, and a spring mechanism disposed within the body, the spring mechanism including an upper portion exhibiting a first spring constant, and a lower portion exhibiting a second spring constant different from the first spring constant, the shock absorber including
        an upper housing including a recess,
        a lower housing including a recess,
        a spring body having an upper end extending into the recess of the upper housing and a lower end extending into the recess in the lower housing,
        an upper coil spring and a lower coil spring disposed in the spring body, the upper coil spring and lower spring having different spring constants, and
        an upper spring seat disposed with in the upper housing, an upper end of the upper coil spring being disposed on a lower surface of the upper spring seat.

2. The stroller of claim 1, wherein the second end of the wheel attachment member is coupled to a lower intermediate portion of the frame member by a pivot.

3. The stroller of claim 2, wherein the upper end of the shock absorber is coupled to an upper intermediate portion of the frame member.

4. The stroller of claim 1, wherein the upper spring seat is secured within the upper housing by an upper spring seat rivet that passes through the upper spring seat and through apertures defined in front and rear faces of the upper housing.

5. The stroller of claim 1, wherein a lower end of the upper coil spring and an upper end of the lower coil spring rest on upper and lower faces, respectively, of a spring separator disposed with the spring body.

6. The stroller of claim 5, wherein the spring separator is fixed in place within the spring body.

7. The stroller of claim 1, further comprising a marking on the spring body that is obscured by one of the lower housing and the upper housing to a greater degree when the shock absorber is compressed than when the shock absorber is in a relaxed state.

8. The stroller of claim 1, further comprising a single coil spring disposed within the spring body, the single coil spring including an upper portion exhibiting a first spring constant, and a lower portion exhibiting a second spring constant different from the first spring constant.

9. The stroller of claim 8, wherein an upper end of the single coil spring is coupled to a spring retainer that is disposed within the recess of the upper housing.

10. The stroller of claim 9, wherein the spring retainer is secured within the recess of the upper housing by a rivet that passes through an aperture in a front of the upper housing, through the spring retainer, and out of an aperture defined in a rear of the upper housing.

11. The stroller of claim 10, wherein the rivet also passes though slots defined in front and rear faces of the lower housing.

12. The stroller of claim 9, wherein a lower end of the single coil spring rests on a lower spring landing defined at a lower end of the recess of the lower housing.

13. A shock absorber for a child stroller, the shock absorber comprising:
    a body including an upper end coupled to a frame member and a lower end coupled to a wheel attachment member;
    a spring mechanism disposed within the body, the spring mechanism including an upper portion exhibiting a first spring constant, and a lower portion exhibiting a second spring constant different from the first spring constant;
    an upper housing including a recess;
    a lower housing including a recess;
    a spring body having an upper end extending into the recess of the upper housing and a lower end extending into the recess in the lower housing;
    an upper coil spring and a lower coil spring disposed in the spring body, the upper coil spring and lower spring having different spring constants; and
    an upper spring seat disposed with in the upper housing, an upper end of the upper coil spring being disposed on a lower surface of the upper spring seat.

14. The shock absorber of claim 13, wherein the upper spring seat is secured within the upper housing by an upper spring seat rivet that passes through the upper spring seat and through apertures defined in front and rear faces of the upper housing.

15. The shock absorber of claim 13, wherein a lower end of the upper coil spring and an upper end of the lower coil spring rest on upper and lower faces, respectively, of a spring separator disposed with the spring body.

* * * * *